Nov. 24, 1964　　　F. ALTMAN, JR　　　3,157,975
SEALING APPARATUS
Filed Feb. 16, 1961　　　　　　　5 Sheets-Sheet 1
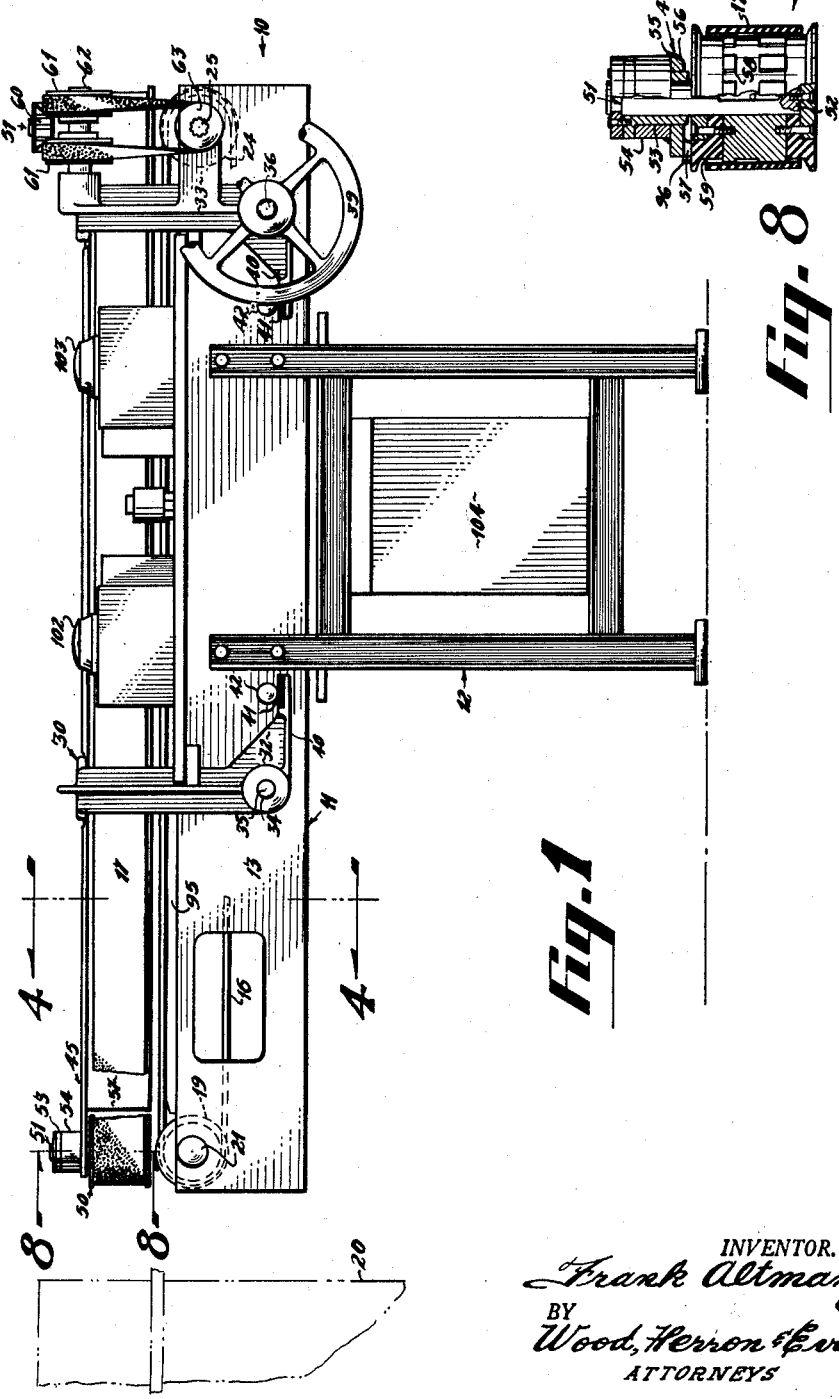
INVENTOR.
Frank Altman Jr
BY
Wood, Herron & Evans
ATTORNEYS Nov. 24, 1964   F. ALTMAN, JR   3,157,975
SEALING APPARATUS
Filed Feb. 16, 1961   5 Sheets-Sheet 2

INVENTOR.
Frank Altman Jr.
BY
Wood, Herron & Evans
ATTORNEYS

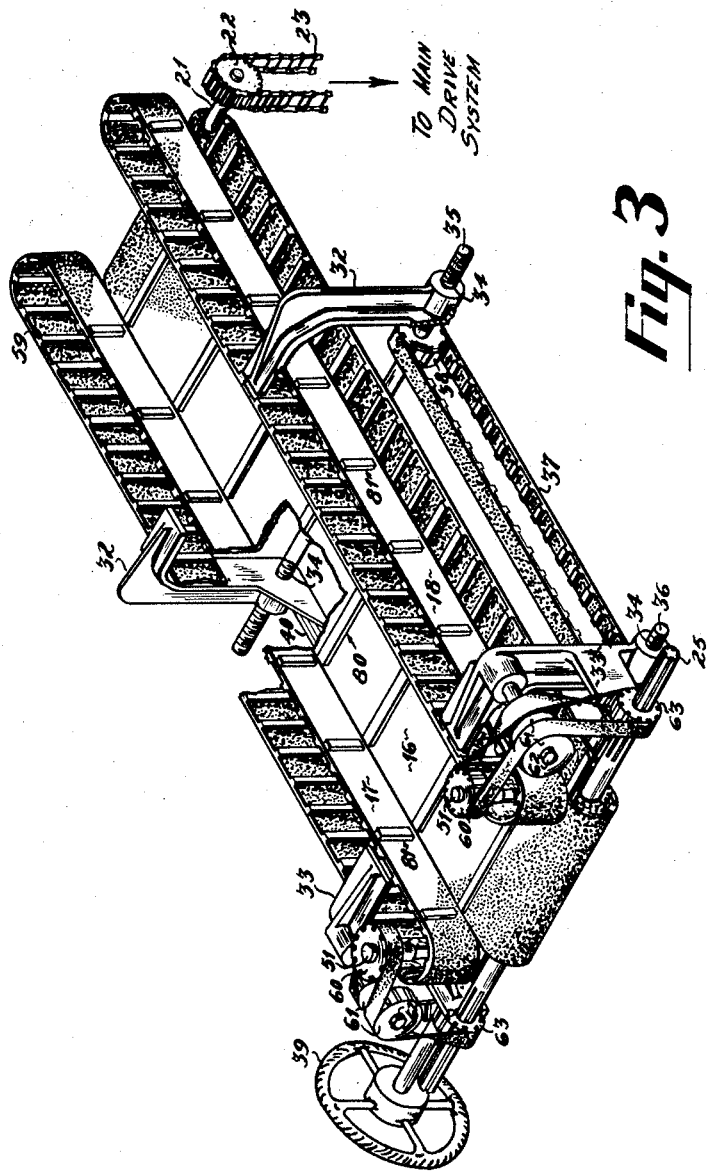

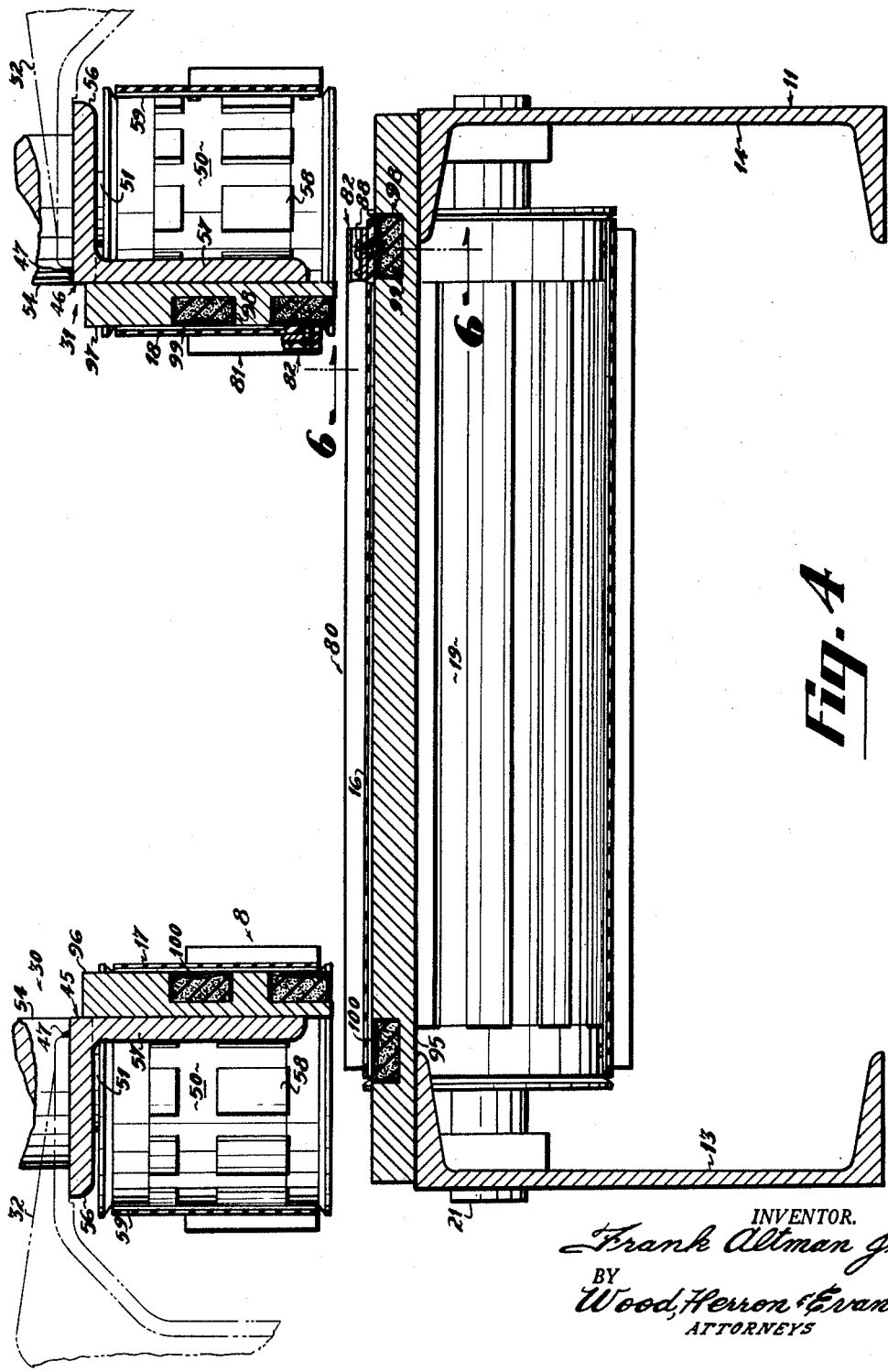

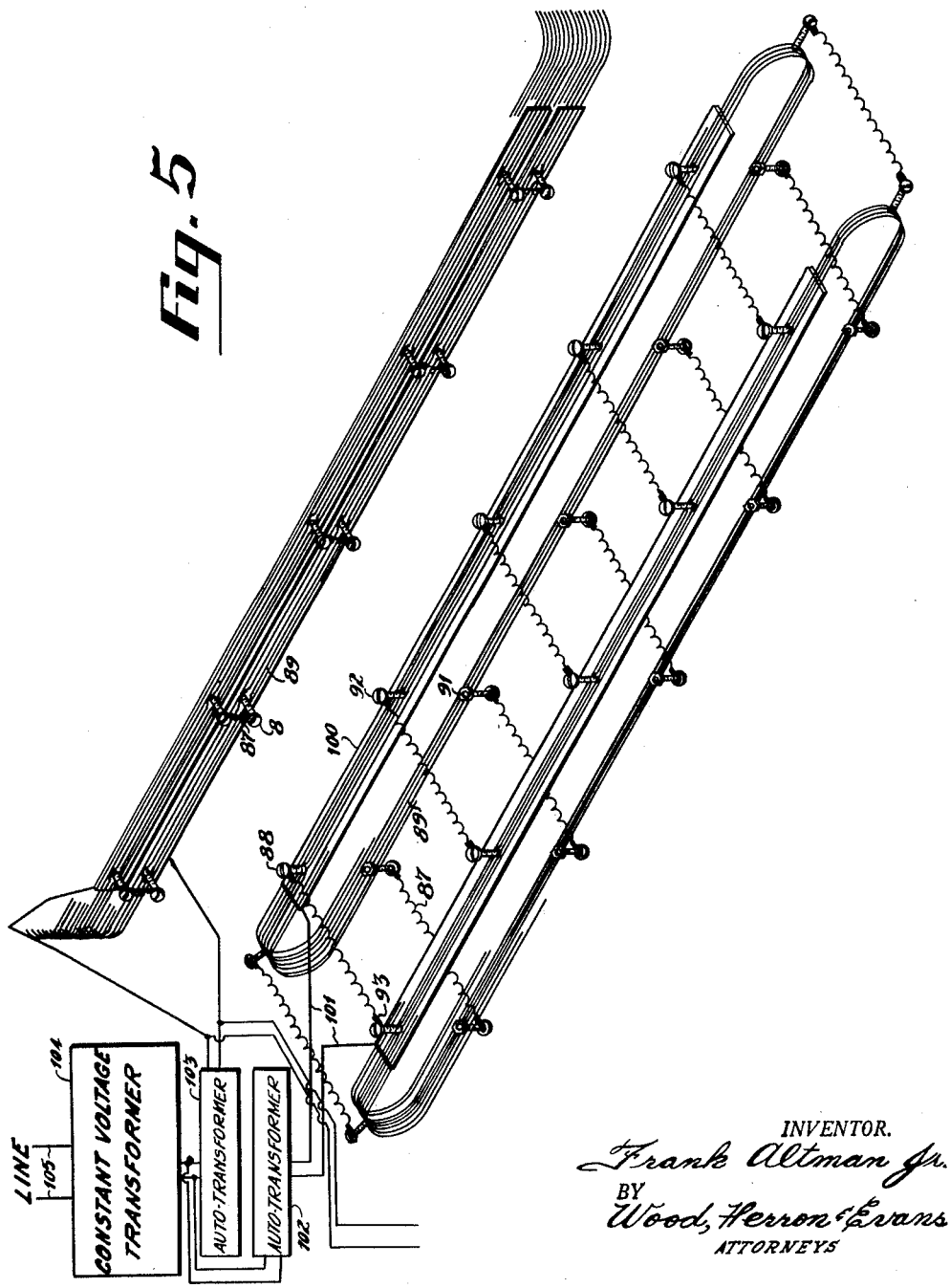

3,157,975
SEALING APPARATUS
Frank Altman, Jr., Dearborn, Mich., assignor to Eagle-Picher Company, Cincinnati, Ohio, a corporation of Ohio
Filed Feb. 16, 1961, Ser. No. 89,689
5 Claims. (Cl. 53—379)

This invention relates to apparatus for conveying and sealing wrappers applied to goods such as bread. More specifically, the invention is directed to apparatus for heat sealing or fusing thin polyethylene wrapping material.

The invention will be described as applied to the sealing of bread wrappers; however, it should be understood that the invention may be employed in sealing the wrappers of other types of articles.

The temperature at which the heat sealing of polyethylene is conducted is quite critical since only a narrow temperature range is permissible during the sealing operation. A temperature below the narrow range will not provide a good seal and a temperature above the sealing range will melt the plastic material and destroy the usefulness of the wrapper or seal.

In the devices of the prior art, attempts have been made to provide a temperature control mechanism in association with the heater apparatus which will assure the application of heat within a very narrow temperature range. In some apparatus this control has taken the form of a pulse of heat of predetermined quantity rapidly applied to the material. In other apparatus the control is provided by individual thermostatic devices associated with each heating element. In still other types of apparatus, very complex expensive structure is required to apply a uniform temperature to the polyethylene material.

It has been an objective of the present invention to provide conveyor-sealer apparatus which is greatly simplified as compared to prior constructions and which provides uniform sealing temperatures to a plurality of heater elements.

The heat sealing apparatus contemplated by the present invention comprises a guideway through which packages are conveyed after the wrapping has been applied to the packages and the projecting endwise portions or flaps of the wrapper have been appropriately folded and are otherwise positioned to be heat sealed in completion of the wrapping operation. For example, in the wrapping of a loaf of bread, which has been selected for my purpose of illustration, it is assumed that the wrapper of polyethylene has been disposed circumferentially around the loaf of bread while the flaps of the wrapper at the endwise portions of the loaf have been overfolded upon one another and the package is therefore ready for heat sealing of the wrapping material along the bottom overlap of the loaf and at each end of the loaf. The conveyor therefor in the preferred construction is of channel or crosslike configuration having a bottom portion which receives the bottom of the loaf of bread and vertical wall portions spaced apart from one another or light pressure engagement with the endwise portions of the loaf. The conveyor is a movable conveyor in the sense that the bottom and end wall elements which engage the loaf are in the form of endless belts having runs respectively positioned to engage the bottom and ends of the package to be sealed. Electric resistance heaters are carried by these belts such that heat is imparted to the polyethylene wrapper from the resistance heaters. The actual heat sealing operation is conducted as the articles to be wrapped are advanced throughout the run of the conveyor by the moving belts which carry the heaters.

In the preferred construction articles to be wrapped as they are delivered from a wrapping machine, or a wrapping machine portion of an entire assembly of which the present heat sealing apparatus constitutes a part, are admitted into the conveyor in spaced relationship to one another and the heaters carried by the belt are also spaced apart a distance corresponding to the spacing of the stream of articles to be sealed, the delivery of articles and the movement of the belt being synchronized to position the heater properly in engagement with the portions of the wrapper to be heat sealed. Thus, in the preferred construction the heaters carried by the belt extend transversely of the belt, one bottom heater and the two respective endwise heaters being arranged in alignment with one another.

An important feature of the present invention resides in the means by which the heaters are energized in unison, and uniformly such that the temperature of the heaters is maintained uniformly at the proper level and within the narrow range of temperature required for proper sealing of polyethylene material. In accordance with this invention each heater of a belt is equipped with means through which electrical energy may be supplied directly to that heater. In addition, however, each belt is equipped with or has associated with it electrically conductive means for supplying energy to all heaters, or, more significantly, to any heater which does not happen to be properly supplied with electrical energy from its direct source of energization. Thus, for example, the heaters of a belt are equipped with contacts which ride commutator strips whereby electrical energy may be supplied to the heaters during their movement through the conveyor section of the heat sealing machine, and in addition electrical conductors are provided which interconnect the appropriate terminals of all heaters of a belt of the conveyor such that electrical energy may be supplied to the heaters through the electrical conductors associated with the belt from any heater which is in electrical connection with the commutator. Thus the present invention contemplates apparatus including a belt having a plurality of heaters associated with it and means for supplying electrical energy directly to the heaters and also indirectly to the heaters through the conductors.

An important feature of this concept is that the arrangement inherently provides uniformity of temperature from heater to heater of any belt of the conveyor system, and if the heaters of all belts of the conveyor system may be interconnected respectively in the same manner all heaters of the entire conveyor may readily be obtained at a temperature which will be uniform from heater to heater at any given moment. A still more important aspect of this construction is that the indirect energization of the heaters, through the conductors associated with the belt permits the heaters to be maintained at operating temperature during the period when the heaters are out of direct contact with the commutators, that is, during the return run of each belt.

By means of this system it has been found that the temperature of the heaters readily may be maintained within the narrow range of temperature which is requisite for the proper heat sealing of sensitive materials such as polyethylene. In recognition of the fact that voltage may vary in a distribution line it is preferred to energize the heaters through an autotransformer or constant voltage transformer which insures uniformity of voltage supply independently of line variation. Ambient temperature variation has been found not to adversely affect operation of the apparatus.

Each heating element, in the preferred construction, has a metallic casing and a heater wire disposed in the casing and electrically isolated therefrom, so that if a constant voltage is applied all elements will generate the same amount of heat and subject polyethylene in contact herewith to the same temperature.

The condition of equilibrium established between heat applied and heat dissipated is not disturbed to a significant extent by the withdrawal of heat during the actual sealing process in view of the low ratio of heat withdrawn to heat stored. Thus, the combination of substantially identical heaters and heat storage means eliminates the necessity of applying individual temperature controls to each heater element.

In its simplest and preferred form, the invention provides for the application of constant voltage to each heater element by employing conveyor belts having endless anti-stretch wires embedded in the belts, the anti-stretch wires being electrically isolated from each other and forming a part of the electrical circuit to which all of the heating elements are connected, whereby they fulfill the double function of imparting mechanical strength to the conveyor belts and reliability of voltage supply to the heaters on the belts. The terminal connectors for the heater elements form the connection to the anti-stretch wires and also form brushes which engage commutator strips mounted adjacent the conveyor belts. Through this combination, all elements are constantly energized by a uniform voltage even though the engagement of some of the terminal connectors with the commutator strips may not provide good electrical contact. The cumulative effect of many terminals in contact with the commutator strips assures a constant voltage applied to the reinforcing wires and all heater elements.

In a conveyor and heat sealer of this type it is important to provide exact synchronization of the end sealing belts with the bottom sealing belt. The invention provides a unique drive mechanism employing a system of timing belts and cog pulleys wherein driving power applied to one of the belts, preferably the horizontal belt, is transmitted to the remaining belts in such a manner as to cause the belts to move in exact synchronization. Further, the system is such that the vertical belts may rapidly be moved toward or away from each other so that the apparatus can accommodate loaves of different lengths.

The several features of the invention will become more readily apparent from the following detailed description taken in conjunction with the accompanying drawings in which:

FIG. 1 is a side elevational view of the invention;

FIG. 3 is a perspective view of the synchronized drive system;

FIG. 4 is a cross sectional view taken along lines 4—4 of FIG. 1;

FIG. 5 is a fragmentary perspective view of the electrical system;

FIG. 8 is a cross sectional view taken along lines 8—8 of FIG. 1.

Figures 6, 7:
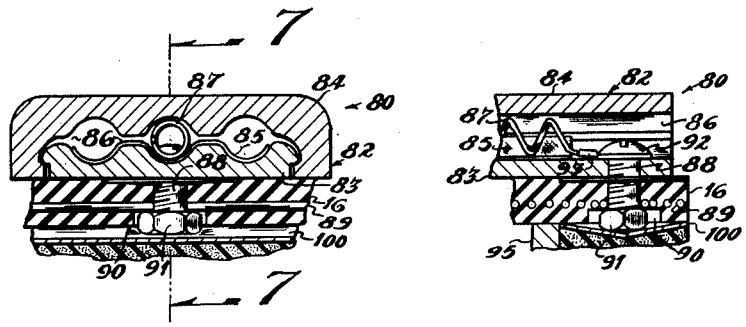
FIG. 6 is a cross sectional view taken along lines 6—6 of FIG. 4.
FIG. 7 is a cross sectional view taken along lines 7—7 of FIG. 6.
Figure 2:
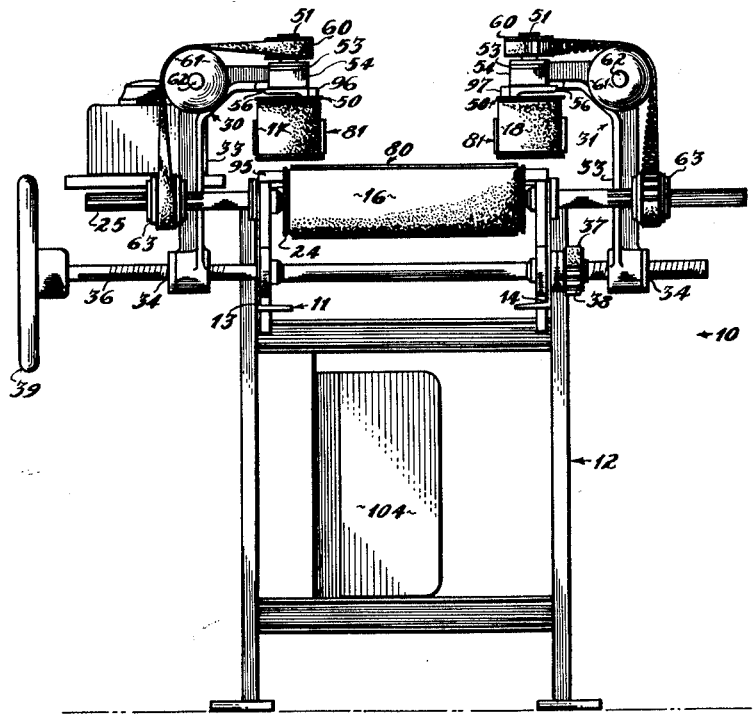
FIG. 2 is an end elevational view thereof.

The heat sealing machine designated as 10 includes a support 11 mounted on a leg structure 12. The support has as its principal structural elements a pair of elongated plates 13 and 14. To the support 11 are mounted a horizontal conveyor belt 16 and a pair of vertical conveyor belts 17 and 18. The horizontal belt is mounted at the leading end on a cog pulley 19 adjacent a bread wrapping machine 20. The cog pulley is mounted on a shaft 21 which is journalled in the support members 13 and 14. The shaft 21 is a drive shaft and as shown in FIG. 3, it has a sprocket 22 fixed to it, the sprocket being drivably engaged by a chain 23. The chain 23 is driven from the main drive system for the bread wrapping machine.

The trailing end of the conveyor belt is mounted on a cog pulley 24 which is fixed to a spline shaft 25, the shaft being journalled in the support plates 13 and 14.

The vertical belts are mounted on spaced frames 30 and 31. The frames 30 and 31 each include two L-shaped brackets 32 and 33. The brackets have a threaded bore 34 by which the brackets are mounted on a pair of screws 35 and 36. The screws 35 and 36 are interconnected for operation and synchronism by means of a timer belt 37 and timer pulleys 38 which are fixed to the screws 35 and 36 respectively. A wheel 39 is fixed to the screw 36 for manual rotation of the screws. It can be seen that rotation of the wheel 39 will cause the bracket members 30 and 31 to move toward or away from each other depending upon the direction that the wheel 39 is turned. Each bracket 30 and 31 has a foot 40 containing a brass insert 41 which bears against a stabilizing rod 42 projecting out from the support plates 13 and 14.

As best shown in FIG. 4, the brackets 32 and 33 support angle members 45 and 46 which are welded on the brackets as at 47.

A cog pulley 50 is rotatably mounted at each end of each angle member 45 and 46. The manner in which the pulley is mounted at the leading end of the apparatus is illustrated in FIG. 8. A spindle or vertical shaft 51 is secured at its lower end 52 to the pulley. The upper end of the spindle 51 is secured to a bearing member 53, the bearing member riding in a bearing block 54. The bearing block is welded as at 55 to the horizontal leg 56 of the angle member 45. It should be noted that the vertical leg 57 of the angle member 45 has been removed at each end of the angle member so as to permit the mounting of the pulley on the angle member.

The vertical belts 17 and 18 are supported on the pulleys 50. The pulleys 50 have cogs 58 which cooperate with cogs 59 on the vertical belt so as to prevent any slippage of the belt with respect to the pulleys.

At the trailing end of the sealing machine, the cog pulleys 50 are mounted in a manner similar to the mounting of the pulleys at the leading end. Additionally, however, the bearing member 53 has a timer pulley 60 fixed thereto. A pair of idler pulleys 61 are journalled on a spindle 62 which is mounted on the bracket member 33. Another timer pulley 63 is slidably mounted on the spline shaft 25 so as to rotate with the spline shaft but to be slidable with respect to the splined shaft. A timer belt 64 on each side of the machine passes about the pulleys 60, the idler pulleys 61 and the timer pulley 63.

The timer belt 64 provides the drive from the horizontal conveyor belt to the vertical conveyor belt. Because the timer pulley 63 is mounted on spline shaft 25, the pulley can be moved toward and away from the main conveyor belt when the frames 30 and 31 are moved toward and away from each upon rotation of the wheel 39.

*The Electrical System*

The horizontal belt 16 has a plurality of longitudinally spaced heater bars 80 secured along the outer surface of the belt. Similarly the belts 17 and 18 have vertically disposed heater bars 81 longitudinally spaced along the outer surface of the belts. As best shown in FIG. 3, the heater bars 80 and 81 are aligned with respect to each other.

As shown in FIGS. 6 and 7, each heater bar comprises a casing 82 having a base 83 and a cover 84. The base and cover are preferably metal of good heat conducting quality such as aluminum and are coated with an electrically insulative material. The outer surface of the cover should be coated with a material such as Teflon (tetrafluoroethylene resin) to eliminate the sticking of the wrapper material to the heater bar. Additionally, a sheet of insulative material such as Fiberglas indicated at 85 is secured to the inner surface of the base 83. The base 83 has a plurality of grooves 86 to receive heaters 87, only one heater 87 being shown in the drawings.

Each heater bar is attached to its belt by securing the ends of each base 83 to the belt. The manner in which the bases are secured is illustrated in FIG. 7 with reference to horizontal conveyor belt 16. It should be understood that all bars of all belts are similarly attached. The securing means at both ends of base 83 comprises a screw 88 which passes through a hole in the base 83 and to a hole in the belt 16.

The belt is formed of a flexible material such as rubber and is reinforced by a series of reinforcing wire 89 which extend longitudinally of the belt and in spaced parallel relation to each other. As can be seen from FIGS. 6 and 7, a portion of the belt forming material has been removed as at 90 in order to bare the reinforcing wires 89 adjacent the screw 88. A nut 91 threaded on the screw 88 secures the base 83 to the belt 16 and additionally forms an electrical contact with the bared reinforcing wires 89 adjacent the screw. The screw 88 has a head 92 which is clamped down on an end 93 of the heater 87 and thus forms electrical contact with the heater 87.

Through the means for mounting each end of every element to its respective belt there is formed an electrical connection of the ends of the heaters 87 to the reinforcing wires 89. Because the wires 89 on one side of a belt are electrically isolated from the wires on the other side of the belt, there will be no short circuit due to the connections of the ends of the heater to the reinforcing wires. Rather, there is formed a parallel circuit of all heater elements, the elements being connected in parallel across sets of reinforcing wires on opposite sides of respective belts 16, 17 and 18.

While the use of the belt reinforcing wires to form the parallel circuit of the heaters is preferred, it should be understood that if the belt has no such wires, a parallel circuit can be formed by a conductive endless band associated with the belt on each side thereof to which the heaters can be connected. During its upper pass, the belt 16 is supported by a back-up plate 95. Similarly, belts 17 and 18 are backed up by plates 96 and 97. Each back-up plate has a pair of recesses 98 into which are positioned resilient insulative mounting pads 99 formed by sponge rubber or the like. Electrically conductive commutator strips 100 are mounted on top of the mounting pads 99.

The recesses, mounting pads and commutator strips are positioned on the respective back-up plates so as to bring the commutator strips into contact with the mounting nuts 91 by which the heater elements are secured to the belt and by which electrical contact is made with the reinforcing wires.

The diagrammatic illustration in FIG. 5 shows the manner in which the electrical circuit is formed with the heaters 87 being connected in parallel with each other through the connection to the reinforcing wires 89 by the mounting screw 88. The commutator strips on which the mounting nuts 90 ride are connected by leads 101 to voltage varying devices such as autotransformers 102 and 103. The transformer 102 is connected to the commutator strip which supplies energy to the element of horizontal conveyor belt 16 whereas the transformer 103 is connected to the commutator strip which supplies voltage to the heaters of vertical conveyor belts 17 and 18.

Both autotransformers are supplied by a constant voltage transformer 104 to which voltage is applied from the line 105. The constant voltage transformer 104 assures that the predetermined level of voltage applied to the heaters will be maintained. The autotransformers 102 and 103 are employed to set the predetermined voltage.

A third variable voltage transformer similar to 102 and 103 may be automatically connected into the circuits during idle periods of the wrapping machine. This third variable voltage transformer is put into the power circuit by a limit switch or magnetic relay or both.

This third transformer reduces the voltage to the heaters during periods when the wrapping machine is idle and prevents overheating of the sealing surfaces.

*Operation*

In the operation of the invention, the heat to be generated by the several heater elements is preset by adjustment of the voltage varying autotransformers 102 and 103. Packages such as loaves of bread are discharged at a uniform rate from a wrapping machine 19 onto the heat sealing machine of the invention. Because the power from the heat sealing machine, the horizontal conveyor belt 16 moves in synchronism with the wrapping machine. The movement of the vertical belts 17 and 18 is also synchronized with the movement of the horizontal belt 16 through the spline shaft 25 which is driven by the belt 16 and the pulleys 60 and 63 and the timer belt 64.

The distance between belts 17 and 18 is adjusted to accommodate the length of the loaf by rotating wheel 39. The wheel 39 is directly fixed to the screw 36. The cog belt 37 and pulleys 38 cause the screw 35 to rotate with the screw 36 when the wheel 39 is rotated. Rotation of the screws 35 and 36 cause the frames 30 and 31 to move away from each other depending upon the direction of the rotation of the wheel 39. The frames 30 and 31 provide the sole support of the belts 17 and 18 and accordingly vary the distance between the belts as the distance between the frames is varied. The synchronized drive to the belts 17 and 18 is not affected by moving the belts 17 and 18 in view of the mounting of the timing gears 63 on the spline shaft 25.

In the original installation of the sealing machine, the heater bars 80 and 81 are positioned in aligned relation as shown in FIG. 3. In sealing a loaf of bread for example, the heater element 80 is in engagement with the overlapping edges of the wrapper at the bottom of the loaf and the elements 81 are in engagement with the folded portions of the wrapper at the ends of the loaf. Preferably the distance between the belts 17 and 18 is such as to apply a slight pressure to the belts to force the belts to move in engagement with their respective back-up plates 96 and 97.

As the belts move into contact with the back-up plates, the heater bar securing nuts act as brushes which slide along the commutator strips 100. The voltage applied to the commutator strips 100 from the autotransformers 102 and 103 is thus transmitted to the heaters 87 disposed within the respective heater bars 80 and 81. Additionally, as best illustrated in FIG. 5, two sets of reinforcing wires 89 in each belt have the output voltage of the autotransformers impressed across them. The parallel connection of the heater 87 across the reinforcing wires 89 to which voltage is applied provides for the contact application of the desired voltage to all heater elements.

The heat dissipated by the heater elements is substantially equal to the heat put into the elements through the heaters 87 so that the temperature of the elements is maintained substantially constant within a very small tolerance as the heating elements are cycled around the conveyor. Even when the heater securing nuts 91 pass beyond the commutator strips 100, a voltage will be applied to the heater elements through the circuit formed by the reinforcing wires. Further, even though one or more heater elements may not make perfect contact with the commutator strips 100, good contact of only a plurality of good contacts from several of the heater elements assures the application of a constant voltage to the reinforcing wires 89 and thus a constant voltage to all heater elements.

I claim:

1. Apparatus for conveying and sealing goods comprising a support, two spaced threaded rods rotatably mounted in said support, a pair of spaced frame members mounted on said threaded rods and being movable toward and away from each other upon rotation of said threaded rods, a pair of longitudinally spaced vertical shafts mounted on each of said frames, cog pulleys mounted on said shafts, cog type conveyor belts drivably connected to said pulleys, a pair of horizontal splined shafts rotatably mounted on said support below said pulleys, cog pulleys mounted on said horizontal shafts, a horizontal cog type conveyor belt mounted on said puleys, timer pulleys fixed to each of said horizontal and vertical shafts, timer belts passing around said cog pulleys to synchronize movement of all conveyor belts, aligned longitudinally spaced heaters disposed on all conveyor belts, means electrically connecting all heaters on respective belts in parallel, spaced commutator strips mounted adjacent the inner surface of each said conveyor belt, means electrically connecting at least some of said heaters to said commutator strips, and means for connecting said commutator strips to a source of voltage.

2. Apparatus for sealing and conveying goods comprising, at least one endless belt formed of an endless sheet of flexible insulative material and spaced parallel endless reinforcing wires embedded in said sheet, transverse heaters mounted in spaced parallel relation on the outer surface of said belt, means electrically connecting each end of said heaters to some of said reinforcing wires, brushes extending from the ends of said heaters through said belt and projecting from the inner surface of said belt, a pair of spaced commutator strips mounted adjacent the inner surface of said belt and engageable by said brushes, and means for connecting said commutator strips to a power supply.

3. Apparatus for sealing and conveying goods comprising, at least one endless belt formed of an endless sheet of flexible insulative material and spaced parallel endless reinforcing wires embedded in said sheet, transverse metallic sealer bars mounted in spaced parallel relation on the outer surface of said belt, heaters mounted in said bars and electrically insulated therefrom, means electrically connecting each end of said heaters to some of said reinforcing wires, brushes extending from the ends of said heaters through said belt and projecting from the inner surface of said belt, a pair of spaced commutator strips mounted adjacent the inner surface of said belt and engageable by said brushes, and means for connecting said commutator strips to a power supply.

4. Apparatus for sealing and conveying goods comprising, at least one endless belt formed of an endless sheet of flexible insulative material and spaced parallel endless reinforcing wires embedded in said sheet, transverse heaters mounted in spaced parallel relation on the outer surface of said belt, means electrically connecting each end of said heaters to some of said reinforcing wires, a pair of spaced commutator strips mounted adjacent the inner surface of said belt, means electrically connecting at least some of said heaters to said commutator strips, and means for connecting said commutator strips to a power supply.

5. Apparatus for sealing and conveying goods comprising, at least one endless belt formed of an endless sheet of flexible insulative material and spaced parallel endless reinforcing wires embedded in said sheet, transverse heaters mounted in spaced parallel relation on the outer surface of said belt, means electrically connecting each end of said heaters to some of said reinforcing wires, brushes extending from the ends of said heaters through said belt and projecting from the inner surface of said belt, a pair of spaced commutator strips mounted adjacent the inner surface of said belt and engageable by said brushes, a source of substantially constant voltage and means for connecting said commutator strips to said voltage source.

References Cited in the file of this patent

UNITED STATES PATENTS

| | | |
|---|---|---|
| 2,082,945 | Ferenci | June 8, 1937 |
| 2,738,631 | Jarund | Mar. 20, 1956 |
| 3,001,348 | Rado | Sept. 26, 1961 |
| 3,075,326 | Waite | Jan. 29, 1963 |

FOREIGN PATENTS

| | | |
|---|---|---|
| 114,269 | Australia | Dec. 4, 1941 |